United States Patent
Prokhorov et al.

(10) Patent No.: US 8,209,080 B2
(45) Date of Patent: Jun. 26, 2012

(54) SYSTEM FOR DETERMINING MOST PROBABLE CAUSE OF A PROBLEM IN A PLANT

(75) Inventors: Danil V. Prokhorov, Canton, MI (US); Setu Madhavi Namburu, Dorchester, MA (US); Sandesh J. Ghimire, Ann Arbor, MI (US); Liu Qiao, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 491 days.

(21) Appl. No.: 12/430,565

(22) Filed: Apr. 27, 2009

(65) Prior Publication Data
US 2010/0274433 A1 Oct. 28, 2010

(51) Int. Cl.
*G06F 19/00* (2006.01)
(52) U.S. Cl. .............. 701/32.7; 701/29.1; 701/31.8; 701/34.4
(58) Field of Classification Search .............. 701/29–35, 701/29.1, 31.8, 32.7, 34.4
See application file for complete search history.

(56) References Cited

U.S. PATENT DOCUMENTS

| | | | |
|---|---|---|---|
| 4,910,494 A | 3/1990 | Tamai | |
| 4,975,848 A | 12/1990 | Abe et al. | |
| 5,010,482 A | 4/1991 | Keller et al. | |
| 6,175,787 B1 * | 1/2001 | Breed | 701/29 |
| 6,434,541 B1 * | 8/2002 | Tawel et al. | 706/30 |
| 6,609,050 B2 | 8/2003 | Li | |
| 6,643,592 B1 | 11/2003 | Loman et al. | |
| 6,668,219 B2 | 12/2003 | Hwang et al. | |
| 6,738,697 B2 | 5/2004 | Breed | |
| 7,593,796 B2 * | 9/2009 | Prokhorov | 701/29 |
| 2002/0007237 A1 | 1/2002 | Phung et al. | |
| 2006/0085108 A1 | 4/2006 | Grier et al. | |
| 2006/0136105 A1 | 6/2006 | Larson | |
| 2007/0050105 A1 | 3/2007 | Chinnadurai et al. | |

FOREIGN PATENT DOCUMENTS
WO WO-2005/022358 3/2005
* cited by examiner

*Primary Examiner* — Paul N Dickson
*Assistant Examiner* — Timothy Wilhelm
(74) *Attorney, Agent, or Firm* — Gifford, Krass, Sprinkle, Anderson & Citkowski, P.C.

(57) ABSTRACT

A system for determining a most probable cause or causes of a problem in a plant is disclosed. The system includes a plant, the plant having a plurality of subsystems that contribute to the operation of the plant, the plurality of subsystems having operating functions that produce operational signals. A plurality of sensors that are operable to detect the operational signals from the plurality of subsystems and transmit data related to the signals is also provided. An advisory system is disclosed that receives an input, the input being in the form of data from the plurality of sensors, possible input root causes of the problem, possible input symptoms of the problem and/or combinations thereof. The advisory system has an autoencoder in the form of a recurrent neural network. The recurrent neural network has sparse connectivity in a plurality of nodes, and the autoencoder is also operable to receive the input and perform multiple iterations of computations at each of the plurality of nodes as a function of the input and provide an output. The output can be in the form of possible output causes of the problem, possible output symptoms of the problem and/or combinations thereof.

19 Claims, 2 Drawing Sheets

SYSTEM FOR DETERMINING MOST PROBABLE CAUSE OF A PROBLEM IN A PLANT

FIELD OF THE INVENTION

The present invention relates to a system for diagnosing a problem in a plant. In particular, the present invention relates to a system that determines the most probable cause of a problem in a plant or a subsystem thereof.

BACKGROUND OF THE INVENTION

Machines, also known as plants, continue to evolve into ever more complex systems and subsystems. For example, motor vehicles, copiers, paper making machines and the like continue to be developed with increasing numbers of sensors, increased quality control, improved safety standards, performance enhancements and the like. Such machines typically provide, or seek to provide, increased convenience for a user, improved quality of a product, etc. However, repairing such machines also continues to become more complex and expensive. For example, diagnosis of a problem within such a machine can take extended periods of time if the root cause for the problem is not identified in a relatively short time. In addition, repair manuals and the level of expertise of technicians can be inadequate for complex problem diagnosis and/or to solve problems that have yet to be identified in a new machine. As such, an advisory system that uses artificial intelligence to display probabilistic causes of a problem in a machine in order to aid a technician in troubleshooting the problem would be desirable.

SUMMARY OF THE INVENTION

A system for determining a most probable cause or causes of a problem in a machine or plant is disclosed. The system includes a plant, the plant having a plurality of subsystems that contribute to the operation of the plant, the plurality of subsystems having operating functions that produce operational signals. A plurality of sensors that are operable to detect the operational signals from the plurality of subsystems and transmit data related to the signals can also be provided. An advisory system is disclosed that receives an input, the input being in the form of data from the plurality of sensors, possible input root causes of the problem, possible input symptoms of the problem and/or combinations thereof. The advisory system can have an autoencoder in the form of a recurrent neural network (RNN) and the RNN can exhibit or have sparse connectivity with respect to different levels and/or a plurality of nodes within the RNN. The autoencoder can receive the input and perform multiple iterations of computations at each of the plurality of nodes as a function of the input and provide an output. The output can be in the form of possible output causes of the problem, possible output symptoms of the problem and/or combinations thereof.

The input to the advisory system can be in the form of binary data, continuous data and combinations thereof. The input can at least be provided by an input preprocessor that can convert symbolic and/or qualitative data into quantitative data using defuzzification and/or a fault detector. In addition, the input preprocessor can convert at least part of the data from the plurality of sensors to fault class data or severity level data. In some instances, the input can be in the form of an input vector having 'n' dimensions and the output can be in the form of an output vector also having 'n' dimensions. The input vector can be connected to all of the plurality of nodes within the recurrent neural network, and the output vector can also be connected to all of the plurality of nodes.

The advisory system is operable such that the input can be in the form of only the possible input symptoms, while the output includes all of the possible output causes. In addition, the advisory system can take input in the form of only a partial list or partial knowledge of possible input causes and possible input systems for the problem and produce an output in the form of a complete list or complete knowledge of possible output causes and possible output symptoms. In this manner, the advisory system takes known possible input data and provides root cause pairings and learns a relationship between symptoms and causes. As such, the advisory system can identify new cause-effect resolution pairings and form a dynamic knowledge base.

In some instances, the plant is a motor vehicle and the subsystems can include a power plant system for the motor vehicle, a drive train and control system for the motor vehicle, an occupant safety system for the motor vehicle, an occupant comfort system for the motor vehicle and/or an emissions system for the motor vehicle.

DETAILED DESCRIPTION OF THE PRESENT INVENTION

Figure 1:
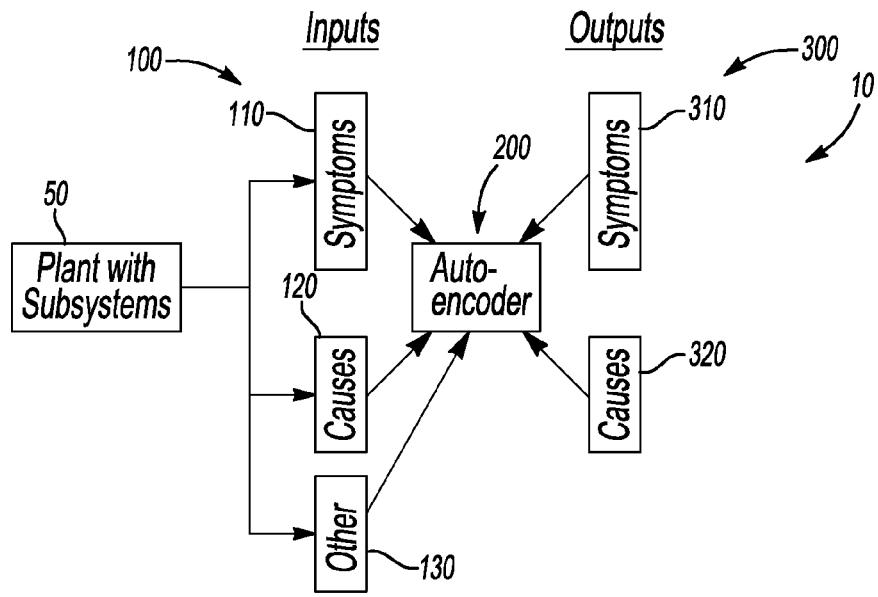
FIG. 1 is a schematic diagram of an advisory system for determining a most probable cause or causes for a problem of a plant.

The present invention discloses a system for determining a most probable cause or causes for a problem within a plant. The system takes known possible input and provides root cause pairings and learns a relationship between symptoms and causes. In addition, the system identifies new cause-effect resolution pairings and forms a dynamic knowledge base. As such, the present invention has utility for assisting a technician or technicians in repairing a plant.

The system can include a plant that has a plurality of subsystems that contribute to the operation of the plant. The plurality of subsystems each have operating functions that produce operational signals. In some instances, each of the plurality of systems can have one or more components, with at least one of the components producing a signal that is a function of its operation. A plurality of sensors can be included, the sensors operable to detect and receive the operational signals from the plurality of subsystems and/or components of the subsystems and transmit data related thereto.

An input preprocessor operable to receive the data from the plurality of sensors and provide an input to an advisory system can also be included. The advisory system is operable to receive the input and provide an output. The input can be in the form of the data from the plurality of sensors, possible input root causes of the problem, possible input symptoms of the problem and combinations thereof. In addition, the input can be in the form of data that has been derived or transformed from the plurality of sensor data. The output can be in the form of possible output causes of the problem, possible output symptoms of the problem and combinations thereof.

The advisory system can include an autoencoder. The autoencoder can be in the form of a recurrent neural network (RNN), and in some instances can be in the form of a heterogeneous RNN. The RNN can exhibit or have sparse connectivity with respect to different levels and/or a plurality of nodes within the RNN. The autoencoder can receive the input and perform multiple iterations of computations at each of the plurality of nodes and provide the output. In some instances, the advisory system can receive an input vector having 'n' dimensions and provide an output vector also having 'n' dimensions.

The nodes can receive input from all input connections to the advisory system and each node may or may not be operable to perform different mathematical operations. For example and for illustrative purposes only, one or more of the nodes, and in some instances all of the nodes, can calculate weighted summations, multiplications, nonlinear squashing and the like. In addition, each node can be connected via trainable links with immediate neighbors and a local neighborhood of nodes can represent a specific subsystem of the plant.

In some instances, the plant is a motor vehicle, the motor vehicle having subsystems such as a power plant system, a drive train and control system, an occupant safety system, an occupant comfort system, an emissions system and the like. The input to the advisory system can include binary data, continuous data and combinations thereof. In addition, symbolic and qualitative data can be transformed into quantitative data using defuzzification and/or a fault detector. The defuzzification and/or fault detector can convert at least part of the data to fault class data and/or severity level data.

The sparse connectivity of the RNN affords for the advisory system to at least partially decouple selected subsystems of the plant. For example and for illustrative purposes only, headlights of a motor vehicle could be decoupled from tires of the motor vehicle. It is appreciated that such subsystems can be only partially decoupled such that when, for example, a battery of the motor vehicle is 'dead', then neither the headlights nor one or more components of the anti-locking brake system (ABS) in the tires would be operating and the headlights and tires could be coupled to the extent that the inventive system would recognize such a scenario and provide a most probable cause as to the failure of the headlights and/or ABS.

The multiple iterations of computations at each of the plurality of nodes as a function of the input affords for the advisory system to learn relationships between systems and causes, thereby affording for a trainable dynamic system. In this manner, the advisory system can identify new cause-effect resolution pairings and create and maintain a dynamic knowledge base.

During operation, the inventive system can include an input vector set to specified values that reflect knowledge about symptoms and/or probable causes about a given plant problem. In some instances, the input vector can be incomplete, that is, the input vector can reflect incomplete knowledge about the problem. After receiving the input vector, the RNN is allowed to perform multiple computation iterations at one or more nodes and subsequently generate an output vector. The output vector can be compared with the input vector, with a properly configured and trained RNN per the inventive system producing output values/elements that are generally the same as input values/elements.

It is appreciated that any given output value for each element of the output vector does not have to be a fixed value resulting from convergence of the multiple computation iterations, but can in fact be an average of oscillating values for some predefined number of iterations. In addition, when the RNN is provided with incomplete information it can complete the missing information. For example, and for illustrative purposes only, the RNN can be provided with only partial knowledge of possible symptoms for a given problem and yet still provide complete knowledge of possible causes, or in the alternative, the RNN can be provided with incomplete knowledge about possible symptoms and causes and yet still provide complete knowledge about possible symptoms and causes.

The RNN can be trained and validated using assembled data sets that represent examples of successful repairs on one or more problems for a plant. If successful, it is appreciated that one or more root causes for a given problem are determined. As such, data for a representative set of example repair cases can be provided to the RNN as input. The RNN can then be trained using one or more algorithms until a suitable error criterion is met on an assembled data set. For example and for illustrative purposes only, a gradient descent algorithm can be used to train the RNN, with proper care taken for temporal order, such that a root-mean-square error decreases to below a predefined value when a validation data set is provided as input to the RNN. The predefined value can be known as a training error function value. After the RNN autoencoder has been trained, it can be tested with a new or unseen set of data. The RNN is considered trained if a value of a test error function is sufficiently close to the training error function value achieved at the end of RNN training. In the event that the test error function value is not sufficiently close to the predefined error function value, then the RNN can be trained further with additional example data sets and tested again until an acceptable error is obtained for new or unseen data sets.

After the advisory system learns one or more relationships between symptoms and causes for one or more problems, the advisory system is operable to receive possible input symptoms only and yet provide possible output causes. Likewise, the advisory system can receive input in the form of only a partial list or partial knowledge of possible input causes and possible input symptoms and yet provide a complete list or complete knowledge of possible output causes and a complete list of possible output symptoms.

Turning now to FIG. 1, an embodiment of a system for determining a most probable cause or causes for a problem in a plant is shown generally at reference numeral 10. The system 10 can include a plant with a plurality of subsystems 50 that provides inputs 100 to an autoencoder 200, the autoencoder 200 affording for outputs 300. It is appreciated that the outputs 300 provide a most probable cause or causes of a problem for the plant with subsystems 50. The inputs 100 can be in the form of possible input symptoms 110, possible input causes 120 and/or other inputs 130. The outputs can be in the form of possible output symptoms 310 and possible output causes 320. The plant with subsystems 50 can provide input data in the form of the possible input symptoms 110, the possible input causes 120 and/or the other inputs 130.

Figure 2:
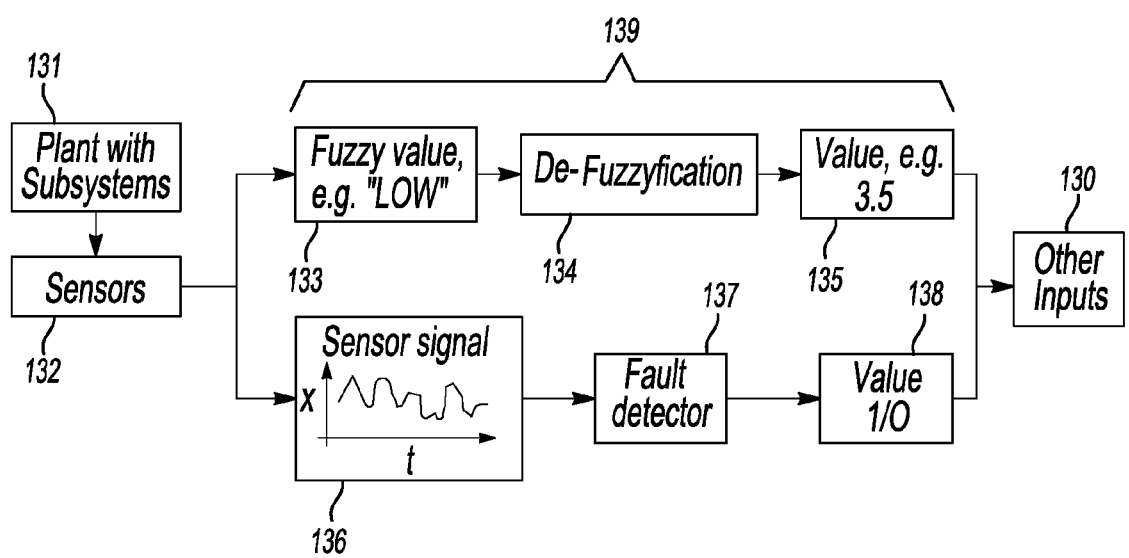
FIG. 2 is a schematic diagram of a plant having a plurality of sensors, the plurality of sensors providing data to an input preprocessor.

Turning now to FIG. 2, another embodiment can include a plant with a plurality of subsystems 131 in electronic communication with a plurality of sensors 132, the sensors 132 providing data to an input preprocessor 139. The plant with subsystems 131 can be a motor vehicle, a copy machine, paper making machine and the like. In addition, the subsystems for the plant 131 can illustratively include a power plant system, a drive train and control system, a safety system, a comfort system, an emissions system and the like.

The plurality of sensors 132 can be operable to detect operational signals from the subsystems of the plant with subsystems 131. In some instances, the subsystems can have one or more components that perform operational functions, the performance of an operational function producing one or more signals. In addition, the sensors can transmit data that is related to or is a function of the operational signals to the input preprocessor 139. As shown in FIG. 2, and for illustrative purposes only, the sensors 132 can provide a fuzzy value 133, the input preprocessor 139 affording for defuzzification 134 of the fuzzy value 133 in order to produce a fixed value 135. The fixed value 135 can be used as an 'other' input 130 which can be provided to the autoencoder 200.

The sensors 132 can also provide an analog or digital sensor signal 136 to the input preprocessor 139. The input preprocessor 139 affords for a fault detector 137 which can provide a binary signal value 138 which is a function of the sensor signal 136. For example and for illustrative purposes only, an average of the sensor signal 136 can be calculated by the input preprocessor 139, the average value then used to determine whether a fault has been detected or is present by the fault detector 137. The binary value 138 can also be used as an 'other' input 130, which can be provided to the autoencoder 200. In this manner, symbolic and/or qualitative data can be converted into quantitative data using defuzzification and sensor data or signals can be converted into fault detection. It is appreciated that other types of processing, transformation, manipulation, etc., can be performed on signals from the subsystems 131 and/or data from the sensors 132 before such information is received by the autoencoder 200.

Figure 3:
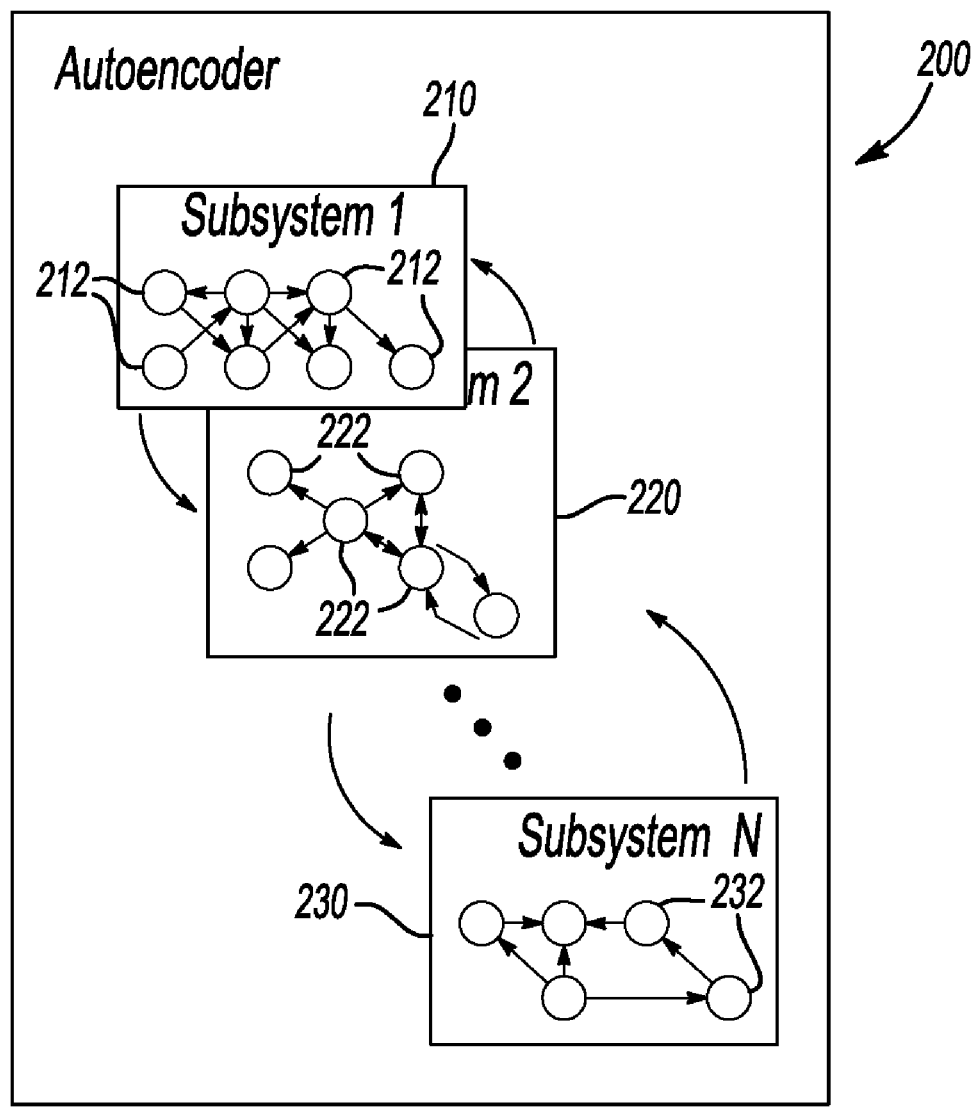
FIG. 3 is a schematic diagram of the autoencoder shown in FIG. 1.

Turning to FIG. 3, the autoencoder 200 can be in the form of a heterogeneous RNN, the heterogeneous RNN having sparse connectivity and a plurality of nodes. For example, the autoencoder 200 can have a plurality of levels 210, 220, . . . 230 as shown in FIG. 3. Each of the levels can have a plurality of nodes, illustratively shown as 212 within the level 210, 222 within the level 220 and 232 within the level 230. Each of the levels 210, 220, . . . 230 can be sparsely connected to each of the other levels, as can the plurality of nodes within each level. Stated differently, the level 210 may or may not be connected with the level 230 and a particular node 212 within the level 210 may or may not be connected with a different given node 212. It is appreciated that the sparse connectivity of the RNN affords for various subsystems within a plant to be interconnected, or in the alternative not be interconnected. For example and for illustrative purposes only, a subsystem within a motor vehicle that monitors the air pressure of the motor vehicle tires may not be interconnected with the power plant system for the motor vehicle.

The autoencoder 200 can be an artificial neural network used for learning efficient codings. The autoencoder 200 can have three or more layers, illustratively including an input layer, a number of considerably smaller hidden layers which form the encoding, and an output layer where each neuron can have the same meaning as in the input layer. The autoencoder can be trained using one or more back propagation variants, for example and for illustrative purposes only, the conjugate gradient method, steepest descent method and the like. It is appreciated that back propagation, also known as propagation of error, is a common method for teaching artificial neural networks how to perform a given task, but also other neural network training methods could be used without deviating from the spirit of this invention.

Training of the autoencoder can include presenting a training sample to the RNN, comparing the network's output to the desired output for the given training sample and calculating the error in each output neuron. For each neuron, the desired output can be calculated and a scaling factor provided to adjust the given output to the desired output. In addition, weights assigned to each neuron can be adjusted to limit their error and/or blame for error to a respective neuron can be assigned to a previous level. In this manner, greater responsibility can be given to neurons connected by stronger weights and the autoencoder can be trained to provide a desired output for any given input.

The plant with a plurality of subsystems can generate or perform various operating functions that produce operational signals. A plurality of sensors can be included, the sensors operable to detect the operational signals from the plurality of subsystems and transmit data that is a function of the operational signals to an input preprocessor. The input preprocessor can accept the data transmitted by the sensors and through fault detection, severity of level functions and/or defuzzification provide one or more inputs to an autoencoder. In addition, possible symptoms and/or possible causes for a problem within the plant can be provided to the autoencoder. Other qualitative data obtained through web mining, maintenance manuals, troubleshooting charts, acquired field cases, design documentation and the like can be provided to the autoencoder.

Using a RNN having sparse connectivity and a plurality of nodes, the autoencoder can take the inputs and provide new cause-effect resolution pairings, a dynamic knowledge base, and/or a most probable cause or causes of a problem for the plant. The autoencoder can be part of or incorporated within a computer which affords for the downloading of sensor data when a motor vehicle is brought to a maintenance shop for repair, routine maintenance and the like. As such, a skilled technician can download the sensor data from the motor vehicle to the computer and the autoencoder can provide a most probable cause or causes of a problem and/or a potential problem for the motor vehicle.

It is appreciated that a computer with the autoencoder can be located within a central station or facility such as a maintenance shop, mechanic shop, etc. In the alternative, the computer with the autoencoder can be in the form of a portable computer used by a technician such that it can be taken to a field site. In addition, the computer with the autoencoder can located on or within the plant itself.

The foregoing drawings, discussion and description are illustrative of specific embodiments of the present invention, but they are not meant to be limitations upon the practice thereof. Numerous modifications and variations of the invention will be readily apparent to those of skill in the art in view of the teaching presented herein. It is the following claims, including all equivalents, which define the scope of the invention.

The invention claimed is:

1. A system for determining a most probable cause or causes of a problem for a plant, said system comprising:
a plant, said plant having a plurality of subsystems that contribute to the operation of the plant, said plurality of subsystems having operating functions that produce operational signals;
a plurality of sensors operable to detect said operational signals from said plurality of subsystems and transmit data related to said operational signals;
an advisory system operable to receive an input, said input being only data from said plurality of sensors and a partial list of possible input causes of the problem or only a partial list of possible input symptoms of the problem;
said advisory system also having an autoencoder in the form of a recurrent neural network (RNN), said RNN having sparse connectivity and a plurality of nodes, said autoencoder also operable to receive said input and perform multiple iterations of computations at each of said plurality of nodes as a function of said input and provide an output;

said output selected from the group consisting of possible output causes of the problem, possible output symptoms of the problem and combinations thereof.

2. The system of claim 1, wherein said plant is a motor vehicle.

3. The system of claim 2, wherein said plurality of subsystems are selected from at least two of the group consisting of a power plant system for the motor vehicle, a drive-train and control system for the motor vehicle, an occupant safety system for the motor vehicle, an occupant comfort system for the motor vehicle and an emissions system for the motor vehicle.

4. The system of claim 1, further comprising an electronic control unit operable to transmit said data from said plurality of sensors to said advisory system.

5. The system of claim 1, further comprising a computer, said computer having said advisory system thereon.

6. The system of claim 1, wherein said input to said advisory system is selected from the group consisting of binary data, continuous data and combinations thereof.

7. The system of claim 6, wherein said input to said advisory system is received from an input preprocessor.

8. The system of claim 7, wherein said input preprocessor converts symbolic and qualitative data into quantitative data using defuzzification.

9. The system of claim 7, wherein said input preprocessor converts at least part of said data from said plurality of sensors to a fault class data or severity level data.

10. The system of claim 7, wherein said input preprocessor converts said data from said plurality of sensors, said possible input causes of the problem and said possible input symptoms of the problem into an input vector having n dimensions.

11. The system of claim 10, wherein said input vector is connected to all of said plurality of nodes within said RNN.

12. The system of claim 10, wherein said autoencoder receives said input vector having n dimensions and produces an output vector having n dimensions.

13. The system of claim 12, wherein said output vector is connected to all of said plurality of nodes within said RNN.

14. The system of claim 1, wherein said input is only said data from said plurality of sensors and said possible input symptoms.

15. The system of claim 14, wherein said output includes said possible output causes.

16. The system of claim 1, wherein said output is a complete list of said possible output causes for the problem and a complete list of said possible output symptoms for the problem.

17. The system of claim 1, wherein said input is only said data from said plurality of sensors and said partial list of said possible input causes.

18. A process for determining a most probable cause or causes of a problem for a motor vehicle, the process system comprising:

providing the motor vehicle, the motor vehicle having a plurality of subsystems that contribute to the operation of the motor vehicle, the plurality of subsystems having operating functions that produce operational signals;

providing a plurality of sensors operable to detect the operational signals from the plurality of subsystems and transmit data that is a function of the signals;

providing an input preprocessor operable to receive input, the input being only data from the plurality of sensors and a partial list of possible input causes to the problem of the motor vehicle or only a partial list of possible input symptoms of the problem of the motor vehicle and provide an input vector having n dimensions;

providing a sparsely connected recurrent autoencoder having a plurality of computation nodes and operable to receive an input selected from data from said plurality of sensors and at least one of possible input causes of the problem and possible input symptoms of the problem;

the sparsely connected recurrent autoencoder also operable to receive the input vector and perform multiple iterations of computations at each of the plurality of computation nodes as a function of the input vector and provide an output;

the output selected from the group consisting of possible output causes of the problem for the motor vehicle, possible output symptoms of the problem for the motor vehicle and combinations thereof.

19. The process of claim 18, wherein the output is an output vector of n dimensions.

* * * * *